March 17, 1970  F. R. KRAUSE  3,501,641
PASSIVE OPTICAL WIND AND TURBULENCE DETECTION SYSTEM
Filed Nov. 1, 1967
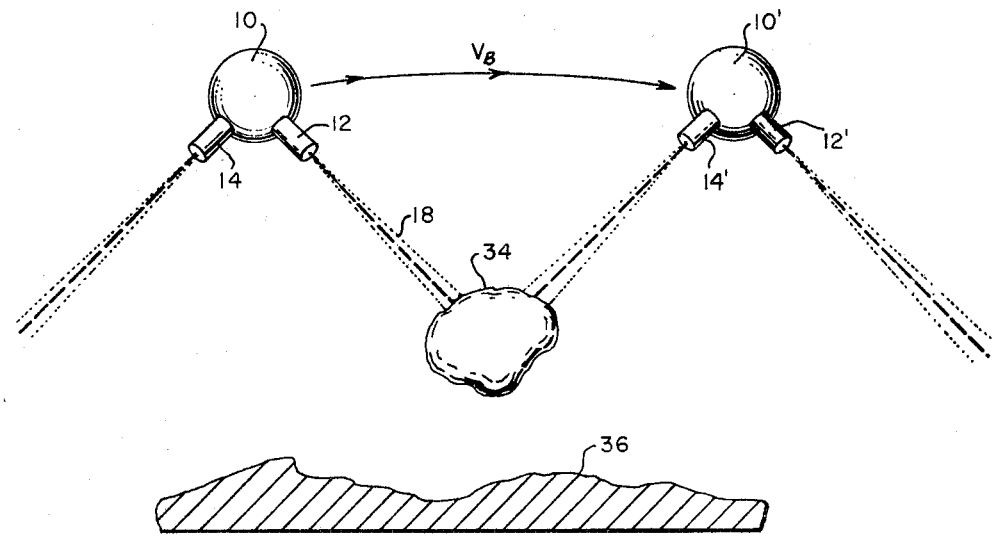
FIG. 1
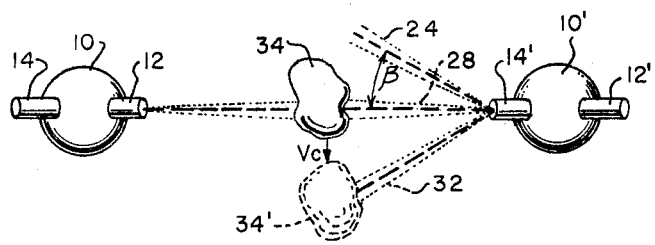
FIG. 2
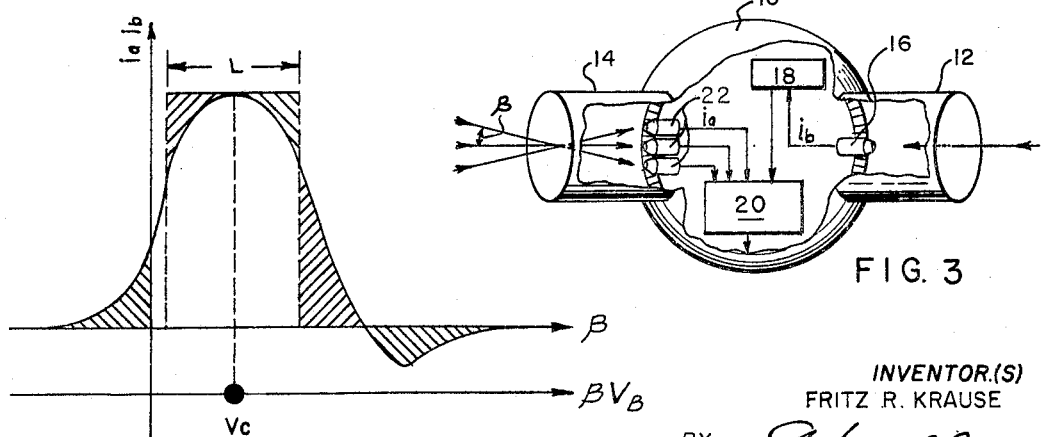
FIG. 3
FIG. 4
INVENTOR.(S)
FRITZ R. KRAUSE
BY
ATTORNEYS United States Patent Office 3,501,641
Patented Mar. 17, 1970

3,501,641
PASSIVE OPTICAL WIND AND TURBULENCE
DETECTION SYSTEM
Fritz R. Krause, Huntsville, Ala., assignor to the United
States of America as represented by the Administrator
of the National Aeronautics and Space Administration
Filed Nov. 1, 1967, Ser. No. 679,862
Int. Cl. H01j 39/12
U.S. Cl. 250—209          4 Claims

ABSTRACT OF THE DISCLOSURE

A rapidly moving remote detection system for monitoring atmospheric conditions over vast and sparsely instrumented areas from a single airplane or satellite. This is accomplished by passive optical detection, i.e., detecting modulations in light from extended natural radiation backgrounds such as scattered sunlight and thermal emission. The apparatus consists of two telescopes having divergent fields of view. A single detector is mounted in one telescope and a fan array of detectors is mounted in the other telescope. A time delay is introduced into the signal of the single detector, the first to view an area, and this generates an effect equivalent to having one undelayed telescope trailing in the same orbit. The lines of sight of the delayed and undelayed telescope detectors intersect at a chosen altitude. Light modulations occurring near this intersection exert a common influence on the detector signals. An on board computer performs a digital correlation analysis of the detector signals in a way known in random vibration analysis and communications to extract local information from the detector signals as to atmospheric conditions at the intersection. The computer provides an entire altitude profile of atmospheric conditions by repeating the data reduction with different time delays.

Background of the invention

The invention described herein was made by an employee of the United States Government and may be manufactured and used by or for the Government for governmental purposes without the payment of any royalties thereon or therefor.

At the present time horizontal winds and other atmospheric phenomena are monitored by instruments on meteorological towers, balloons, aircraft, and rockets. These monitoring systems have many inherent limitations associated with their operation, such as, for example; single path experiments in the case of rockets, restricted altitude ranges in aircraft, and interference with the phenomena of interest. Because of these limitations the solutions to some meteorological problems are not possible with the use of existing instrumentation. Also, present weather prediction methods are plagued with problems such as insufficient points of observation and the unknown effect of small scale disturbances on the behavior of large scale motions. At present, a gird of observation stations is available only in North America, Europe and the northern part of Asia. Except for Australia and very few observation stations in Africa, South America and Antarctica, the Southern Hemisphere is void of data collecting stations.

Attempts are presently being made to measure winds with long-lived constant pressure balloons tracked either from the ground or by satellite. The positions of these balloons depend upon the wind circulation pattern and not on the desires of the meteorologist. Any improvement in providing meteorological information at discrete levels and spacing in the atmosphere and at discrete time intervals, would be a step forward in improving forecasting conditions.

Clear air turbulence and jet streams in the atmosphere are of particular interest in space activities in that these winds have undesirable effects on high speed vehicles, particularly rocket launch vehicles and supersonic transports.

Summary of the invention

The present invention provides a rapid moving remote system for the detection of winds and turbulence in the atmosphere over vast and sparsely instrumented areas.

Detection is accomplished by a "cross-beam" arrangement of radiation detectors mounted on a stabilized orbiting body or aircraft. The term "beam" as used herein means the line of sight or axes of very narrow field of view radiation detectors. Two telescopes are mounted so as to have divergent fields of view. A single detector is mounted in the preceding telescope; i.e., the first one to view an area during orbit, and a fan-shaped array of detectors is mounted in the other telescope. The system is passive in that the detectors sense light modulations from extended natural radiation backgrounds (such as scattered sunlight and thermal emission) present in their respective beams.

The output signal of the single or preceding detector is delayed before being correlated with signals from the detectors in the fan array. By introducing a time lag into the signal of the preceding detector, and due to the fact that the detectors have divergent lines of sight (beams), the effect is created of having a single beam and a fan of beams that intersect at some altitude above the earth's surface. The particular intersection altitude being determined by the time lag in the signal from the single detector. An on board computer whose inputs are the delayed signal from the single detector and signals from the detectors in the fan array performs a digital cross correlation of these inputs to extract local information as to atmospheric conditions at the beam intersection. The fan array of detectors makes it possible to detect horizontal displacement (horizontal movement normal to orbital path of detectors) of the condition being monitored. The computer provides an altitude profile of atmospheric conditions by repeating the data reduction with different time delays.

Cross-beam arrangements of orbiting detectors are effective because of fluctuations in the intensity of radiation occurring in each of the beams. The instantaneous signal of each detector will represent, or be dependent upon, the sum of all such fluctuations occurring along its path. These fluctuations will occur either at a point in the beam sufficiently close to the beam intersection so as to exert a common influence on the signals of the detectors for both beams or at a point of sufficient distance from the beam intersection so as to not exert this common influence. If the covariance (time averaged product) of the two detected signals is arrived at, those portions of the signal created by unrelated fluctuations will yield an average product of zero whereas the signals due to common fluctuations will yield a finite average product.

The technique of detecting and correlating two signals having information common to both signals and extracting the common information is practiced in the art of communications and random vibration analysis. Thus, a mathematical explanation of the theory involved in the signal correlation required to practice this invention is not deemed necessary. Suffice it to say that retrieval of local information at the preselected altitude of beam intersection is accomplished by multiplying beam modulations and averaging the resulting product. The plot of such two beam product mean values against fan angle (angle between line of sight of detector in fan array and centerline of fan array of detectors) is equivalent to the covariance function of the space variations of atmospheric constituents aerosols, $O_3$, water vapor, $CO_2$, etc.) across the fan of beams. Altitude resolution of the space covariance functions is in the vicinity of 60 meters. All calculations are of course carried out by the on board computer. The computer calculates wind components, turbulence scales, three dimensional wave-number components and other atmospheric parameters at the altitude of beam intersection. The product of the beam modulations (detector output signals) are averaged over a horizontal path and the computer decides the length over which the system averages by checking when the statistical error of the two beam product mean values drop below a specified margin. Typical path lengths are estimated to be less than 300 miles. The computer calculates complete altitude profiles of these horizontal path averages with a single fly-by by repeating the calculations mentioned above with a different time delay.

Brief description of drawing

FIGURE 1 is a pictorial representation of the viewing sequence of a pair of telescopes mounted on a satellite.

FIGURE 2 is a view similar to FIGURE 1, but looking up at the satellite.

FIGURE 3 is a schematic illustration of the satellite.

FIGURE 4 is a curve that illustrates the type of information obtained from computer calculations.

Detailed description of invention

Referring now to FIGURE 1 of the drawing wherein two orbiting vehicles 10 and $10^1$ are shown. While two bodies are shown for illustrating the cross-beam arrangement it should be understood that the two bodies are one and the same. In other words, vehicle $10^1$ is in the orbital position vehicle 10 will reach after traveling for a time T at a velocity $V_B$ in the direction indicated by the arrowheads.

Two astronomical telescopes 12 and 14 are mounted on vehicle 10 and the vehicle is stabilized so that the telescopes are always oriented towards the earth. Telescope 12 has a single radiation detector 16 mounted therein in a position at the focal plane of the telescope. Detector 16 has a narrow conical field of view, and the axis of this field of view will be referred to as a "line of sight" or "beam" and it is indicated by the shaded area in FIGURE 1 assigned the numeral 18. The cone angle or divergence of the detector field of view is directly proportional to the size of its photosensitive element and inversely proportional to the focal length of the telescope.

Electromagnetic radiation of any wavelength, from X-rays to microwaves, may be observed so long as the signal (detector output) associated with the atmospheric modulation of the radiation does not produce a signal to noise ratio in excess of 1.0. Modulation of radiation in each detector beam results from trespassing clouds of atmospheric constituents like ozone, aerosols, water vapor, $CO_2$, turbulence, etc. These clouds emit, absorb, and scatter radiation from extended natural sources such as the earth, clouds, skies and the horizon. Thus, any atmospheric phenomena causing such modulations can be detected. The electrical signal from detector 16 ($i_a$) is connected into a time delay 18 of any known type suitable for use in a space environment and from there, after a desired interval of time equal to the time T mentioned above, into a computer 20.

Telescope 14 has a plurality of detectors 22 mounted in its focal plane in a fan array. These detectors are identical to detectors 16 and they are positioned and oriented so that their narrow conical fields of view form a fan of beams, as illustrated in exaggerated form by the shaded areas designated in FIGURE 2 by the numerals 24, 28 and 32. The output signals ($i_b$) from each of the multiple detectors is connected into computer 20. While only three detectors are shown in telescope 14 it should be understood that twenty or more detectors, or any desired number, can be used in the fan array.

The effect of introducing a time lag into the signal from detector 16 can be appreciated when considering FIGURES 1 and 2. When in the position of the satellite indicated by numeral 10, detector 16 is observing a cloud 34 which would scatter and absorb radiation reflected and emitted from the earth's surface 36. As is apparent, cloud 34 would affect the signal from the detector. When the satellite has traveled for a time T and reached the position indicated by $10^1$; then the array of detectors 22 in telescope 14 are viewing cloud 34. If the cloud did not deteriorate substantially during the time T (two minutes usually), then common radiation modulation will occur in beams 18 and 28. However, if the cloud has moved at a velocity $V_c$ to a position as indicated by $34^1$; then common modulations will occur in beams 18 and 32. The time lag introduced into the signal from detector 16 equal to the time T mentioned above creates the effect of having two orbiting telescopes, one trailing the other, whose detectors have intersecting beams or lines of sights and thus view a common area. By having a fan of beams emerging from one telescope, whose lines of sight are oriented at an angle $\beta$ (beta) relative to the center line of fan, it is possible to determine magnitude and/or movement of cloud 34.

This is accomplished by accumulating in the computer memories the two beam product mean values as a function of fan angle and time delay. The resulting matrix array of coordinates represents a set of curves of two beam product mean values against fan angle which have been collected from different altitudes (time delays). An illustrative example of one of these curves is shown in FIGURE 4. For each curve the computer will find the position of the maximum which corresponds to the wind component normal to the plane swept by the center line of the fan. Secondly, the computer will integrate the curve and determine the cloud size L (turbulence length scales) from this integral as shown in FIGURE 4. Further, a Fourier integral of the curve would give the three dimensional wave number components of atmospheric space variations across the fan. All these parameters will describe horizontal motions through vertical planes if the telescopes look upward or downward or vertical motions through horizontal planes if the telescopes look sideways.

This completes the detailed description of the invention. While a preferred exemplary embodiment has been described herein, there will be many changes and modifications which can be made to the invention by one skilled in the art without departing from the spirit and scope of the invention as defined in the claims appended hereto.

For example, although the application of this system has been outlined for airplanes and satellites flying around the earth, the invention may prove to be of utmost importance for mapping "weather" and chemistry in planetary atmosphere other than that of Earth (Jupiter and Venus for example) and the outer layers of the sun.

What is claimed is:

1. An inflight optical system adapted to be mounted in a satellite for monitoring atmospheric conditions comprising:
   a first optical means mounted on a satellite for detecting radiation modulations along a narrow beam and delivering an output signal indicative of the detected modulations;
   said first optical means including a first astronomical telescope and a detector means mounted in the focal plane of said first telescope, said detector means having a narrow field of view so as to limit detection of radiation modulations to a narrow beam;
   a second optical means mounted on the satellite for detecting radiation modulations along divergent narrow beams and delivering output signals indicative of the detected modulations;

said second optical means including a second astronomical telescope and a plurality of detector means mounted in the focal plane of said second telescope, each of said plurality of detector means being oriented and having a narrow field of view so as to provide detection of radiation modulations over a fan array of narrow beams diverging from said second telescope;

said first and second optical means being oriented so as to have substantially divergent fields of view in which radiation modulations are viewed; and data reduction means for introducing a time lag into the signal from the first optical means and then correlating it with subsequent signals from the second optical means, whereby the effect is simulated of having two separate optical means viewing a common area and local information as to atmospheric conditions in the commonly viewed area is extracted from the beam modulations by special digital correlation techniques.

2. The system recited in claim 1 wherein said detectors mounted in said first and second telescopes are of a type which sense fluctuations in radiation intensity and deliver an electric signal whose magnitude varies with the intensity of radiation viewed by the detectors.

3. The system recited in claim 2 wherein the data reduction means includes a computer connected to said first and second optical means for receiving input signals therefrom and performing a digital cross analysis of the signals.

4. The system recited in claim 3 wherein a time delay means is connected between said first optical means and said computer means to introduce the time lag into the signal from the single detector in said first optical means.

References Cited

UNITED STATES PATENTS

| | | | |
|---|---|---|---|
| 2,740,961 | 4/1956 | Slater | 250—208 X |
| 2,866,373 | 12/1958 | Doyle et al. | 250—209 X |
| 2,955,251 | 10/1960 | Shaw et al. | 250—209 X |
| 2,856,809 | 10/1958 | Blackstone | 250—209 X |
| 2,995,662 | 8/1961 | Hamilton | 250—209 |

JAMES W. LAWRENCE, Primary Examiner

C. R. CAMPBELL, Assistant Examiner

U.S. Cl. X.R.

250—43.5, 208, 210, 239